United States Patent
Heard

(10) Patent No.: US 6,381,934 B2
(45) Date of Patent: May 7, 2002

(54) TOPPER AND SHREDDER

(76) Inventor: Martin Perry Heard, 8012 Brentwood, Lubbock, TX (US) 79427

( * ) Notice: Subject to any disclaimer, the term of this patent is extended or adjusted under 35 U.S.C. 154(b) by 0 days.

(21) Appl. No.: 09/790,758

(22) Filed: Feb. 22, 2001

Related U.S. Application Data

(60) Provisional application No. 60/197,043, filed on Apr. 14, 2000.

(51) Int. Cl.⁷ .............................................. A01D 34/66
(52) U.S. Cl. ..................................................... 56/13.6
(58) Field of Search ........................... 56/6, 13.5, 13.6, 56/13.7, 14.1, 17.1, 17.2, 28, 29

(56) References Cited

U.S. PATENT DOCUMENTS

| | | |
|---|---|---|
| 1,325,406 A | 12/1919 | Marquis et al. |
| 1,799,714 A | 4/1931 | Wallace |
| 2,656,665 A | 10/1953 | Paul |
| 3,093,948 A | 6/1963 | Root |
| 4,291,522 A | 9/1981 | Kawasaki et al. ............ 56/15.8 |
| 4,470,245 A | 9/1984 | Agadi ............................. 56/28 |
| 4,962,636 A | 10/1990 | Sampei et al. ................ 56/17.1 |
| 5,115,628 A | 5/1992 | Garter et al. ................. 56/10.2 |

Primary Examiner—Robert E. Pezzuto
(74) Attorney, Agent, or Firm—Wendell Coffee

(57) ABSTRACT

An agricultural implement attached to a farm tractor by a three point hitch is used to cut the top of mature cotton stalks, or shred harvested crops or mow turn rows. Knives are mounted on the bottom of vertical shafts which are rotated by belt driven pulleys. The pulleys are driven from a right angle gear box which is driven from the power take off of the tractor. The knives are staggered along either side of a beam traverse to the direction of travel, so that the knives cannot strike other knives as they mow over-lapping swaths.

20 Claims, 3 Drawing Sheets

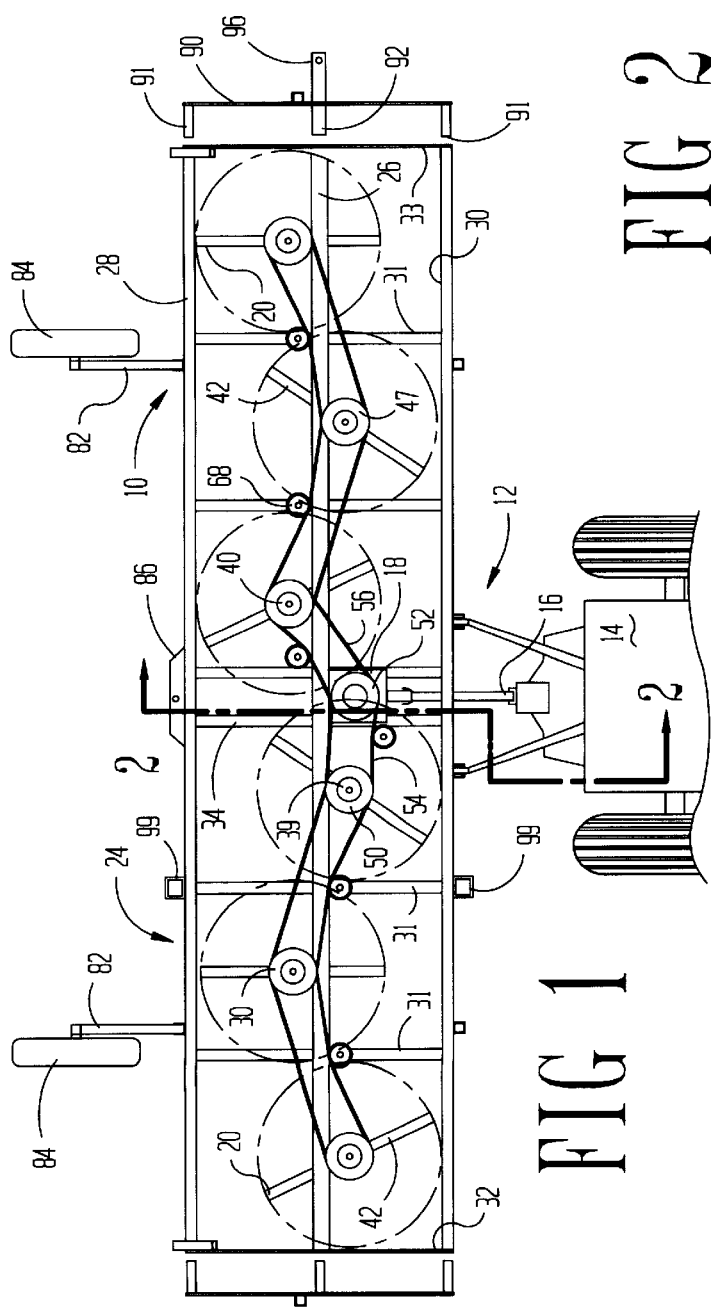
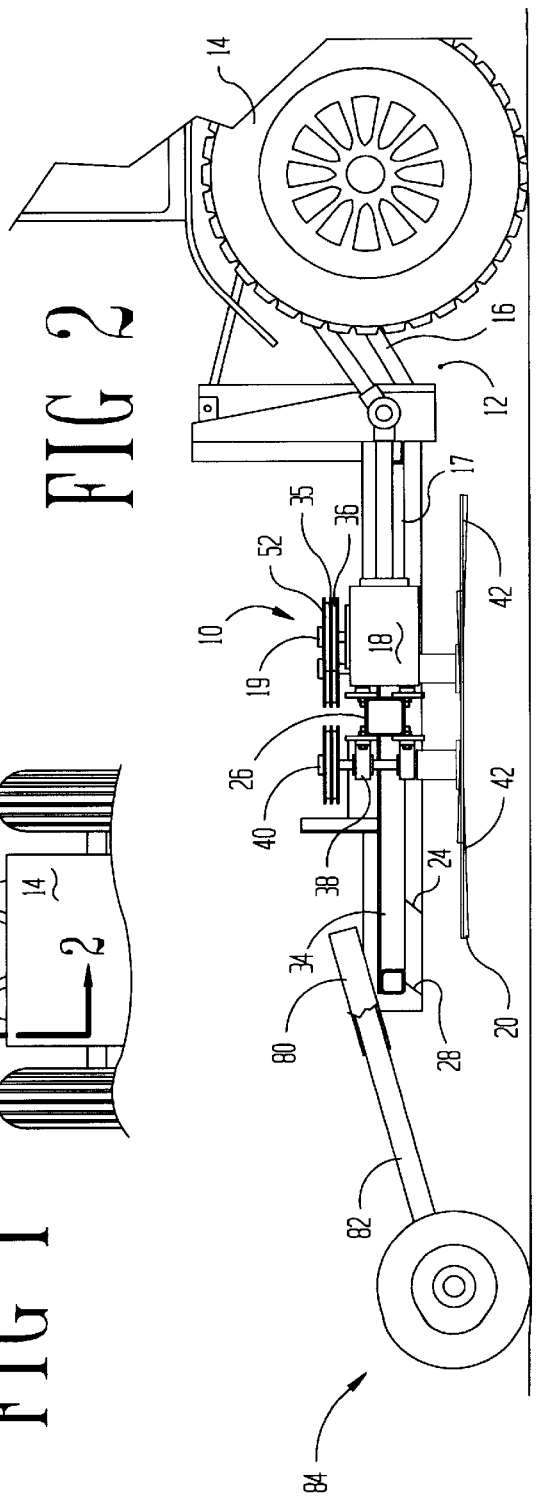

TOPPER AND SHREDDER

CROSS REFERENCE TO PROVISIONAL PATENT APPLICATION

The applicant claims the benefit of his U.S. Provisional Application No. 60/197,043, filed Apr. 14, 2000.

BACKGROUND OF THE INVENTION (1) Field of the Invention

This invention relates to machines for farming and more particularly to machines for treatment of annual crops, preparation of the plants for harvesting, shredding harvested crops, and mowing uncultivated lands such as turn rows, or turn abouts, or road sides.

For example a machine according to this invention is used for cutting the tops off of cotton plants before harvesting. Also the machine is adapted to shred the remains of cotton and other annual crops after harvesting. Farmers have ordinary skill in this art.

(2) Description of the Related Art

Shredder units are known to the prior art. However, normally these prior art shredders have a rotating shaft extending to each of three individual units. Each individual unit has a right angle gear drive upon it. Normally each unit will have an 80 inch blade with the surrounding cover. This results in a heavy expensive unit.

MARQUIS ET AL, U.S. Pat. No. 1,325,406 issued Dec. 16, 1919, discloses a cutter for topping cotton for boll-weevil control. The cutting mechanism for MARQUIS was sickle bar cutters.

SAMPEI ET AL, U.S. Pat. No. 4,962,636 issued Oct. 16, 1990, discloses a lawn mower having three cutting knives attached to vertical shafts. The knives as a unit with the individual belt drive are mounted for raising and lowering with respect to the frame of the vehicle. The motor drive belt remains at a constant height on the vehicle.

KAWASAKI ET AL U.S. Pat. No. 4,291,522 issued Sep. 29, 1981 is similar to SAMPEI ET AL except the cutting unit which is raised and lowered includes a right angled gear box which is raised and lowered with the cutting knives. There are three cutting knives one which is mounted on the same shaft as the right angle gear box and the other two are driven by a single belt twining about pulleys on the shaft holding the knives of each unit.

WALLACE U.S. Pat. No. 1,799,714 issued Apr. 7, 1931 discloses a lawn mower having three vertical shafts with a cutting knife on each vertical shaft. The center vertical shaft is driven by the shaft of an electric motor and the other two shafts are driven by separate belts from the electric motor to the pulley upon the shaft. The entire cutting assembly of Wallace may be raised or lowered by raising or lowering the cutting mechanism frame with respect to the lawn mower frame.

SUMMARY OF THE INVENTION (1) Progressive Contribution to the Art

This invention is for a shredder or topper which is readily attachable to modern tractors with three point hitches. A wide swath is made which may cover as much as eight 40 inch rows of cotton at one pass. To enable the tractor to carry this equipment requires that the equipment be light weight. Therefore the cutting knives are driven by belt drives which are lighter as well as less expensive than gear drives. The knives are mounted upon vertical shafts. All the shafts are of the same length for uniform cutting height. To avoid contact of the adjacent knives, the knives are staggered on either side of a beam. In this way the paths of adjacent knives may over lap but the adjacent knives are spaced apart. When mowing, an overlap is desirable so a gap is not present. Most of the cutting assemblies for each row are identical thereby reducing the amount of repair parts needed.

When the implement is used to mow turn rows a swath of about 20 feet (six 40 inch rows) or less is desirable because of maneuvering necessary. However, when topping an additional two rows is desirable. Therefore a basic unit with six knife units is built with two attachable wings to carry another knife unit each is desired.

When topping cotton, the top of the plants in the drill are the only concern; therefore it is not important that the knives overlap. Therefore on the wings a wing shaft 40" from the permanent out board shaft with a 25 inch knife is adequate.

Also provisions are made to have a single set of wheels which maybe used as gage wheels when the unit is in operation in the field and which may also be used as trailer wheels when the unit is being to towed from one field to the other or to storage area.

Skids are mounted on each side of the implement to prevent the knives from contacting the ground. Spring loaded idler pulleys bear against the slack run of each belt to insure against belt slippage. Also the idler pulleys lengthen the life of the belts.

(2) Objects of this Invention

An object of this invention is to provide an implement which may be used (1) to rapidly cut the tops from plants before harvest, (2) to shred plants left standing after harvest, and (3) to mow weeds around the fields.

Another object is to provide such an implement which with only one set of wheels so that one set of wheels may be used both to be used as gage wheels and trailer wheels.

Further objects are to achieve the above with a device that is sturdy, compact, durable, lightweight, simple, safe, efficient, versatile, ecologically compatible, low maintance energy conserving, and reliable, yet inexpensive and easy to manufacture, attach, operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 1 is a plan view of an implement attached to a tractor which is an embodiment of the invention.

FIG. 2 is sectional elevational view taken substantially on line 2—2 of FIG. 1.

CATALOGUE OF ELEMENTS

Figure 3:
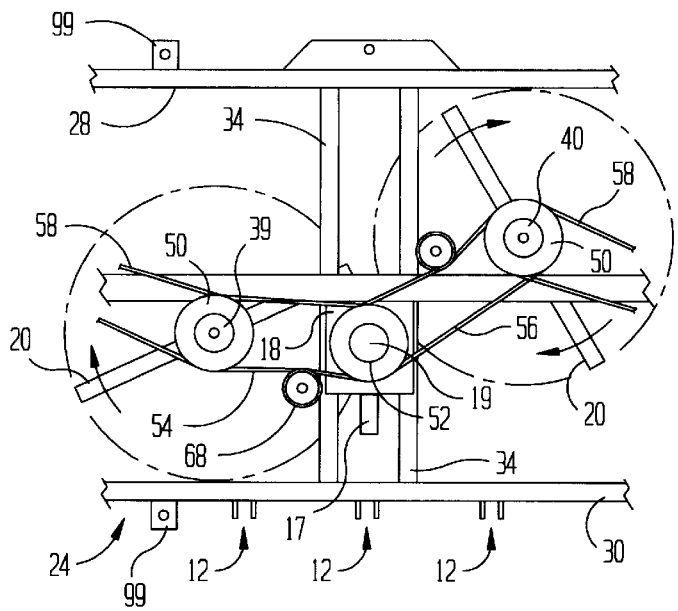
FIG. 3 is an enlarged plan view of the center portion of the implement.
Figure 4:
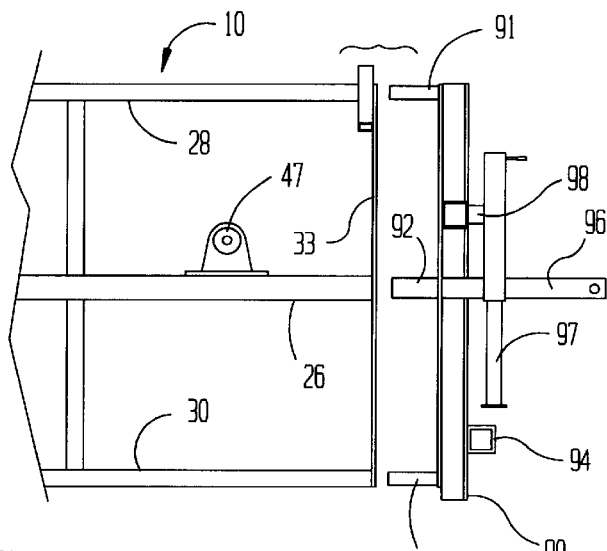
FIG. 4 is an enlarged plan view of one end of the implement.

As an aid to correlating the terms of the claims to the exemplary drawing(s), the following catalog of elements and steps is provided:

| | | | |
|---|---|---|---|
| 10 | implement | 66 | idler shaft |
| 12 | 3-point hitch | 68 | idler |
| 14 | tractor | 70 | eye |
| 16 | PTO | 72 | adjustment bolt |
| 17 | horizontal shaft | 74 | clip |
| 18 | right gear box | 76 | winged nut |
| 19 | vertical shaft | 78 | blocking pin |
| 20 | blades | 80 | tubes |
| 24 | frame | 82 | leg |
| 26 | main center beam | 84 | wheel |
| 28 | back | 86 | plate |
| 30 | front | 88 | stands |
| 31 | cross brace | 90 | ends |
| 32 | side | 91 | square tubing |
| 33 | side | 92 | larger square tubing |
| 34 | cross bar | 94 | stand holder |
| 35 | top groove | 96 | trailer hitch |
| 36 | bottom groove | 98 | swivel joint |
| 38 | bearing (back) | 99 | square tubing |
| 39 | knife shaft (front) | 100 | additional unit |
| 40 | knife shaft (back) | 126 | added center beam |
| 42 | knife, knives | 128 | added back |
| 50 | knife pulley | 129 | stub |
| 52 | power pulley | 130 | added front |
| 54 | front belt | 142 | added knife |
| 56 | back belt | 146 | added knife shaft |
| 60 | arm | 150 | added knife pulley |
| 62 | shaft | 158 | added belt |
| 64 | spring | | |

DESCRIPTION OF THE PREFERRED EMBODIMENTS(S)

This machine, an implement, is built to use on farms of annual crops, such as cotton. The implement is to be used as a shredder, mower, or topper; however, it is some times referred to as "shredder" herein.

Referring to the drawings, FIG. 1 shows a top plan view of the shredder in a six row mode.

Implement 10 is adapted to be attached to a farm tractor 14 by a conventional three point hitch 12. The implement 10 will be driven by a power take off 16 (PTO) which extends from the tractor 14 to right angle gear box 18 mounted upon the implement. The three point hitch is well known in the agriculture arts and it permits the implement 10 to be raised to an elevation of about three feet above the ground where it is used as a topper to sever the terminal bud from the cotton plant. The topper procedure is for the purposes of permitting defoliants to be readily applied to the plant, and harvesting of cotton.

The implement may be lowered by the three point hitch so that it is about three inches off the ground. At this height it is used to shred the stalks after a crop has been harvested or to mow turnrows of other growths or weeds. By height is meant the height of blades 20 on knifes 42.

Frame 24 is formed by elongated square tubes. Main center beam 26 is a square tube and extends along the middle of the frame 24. A front 30 is formed by a square tube on the forward portion of the frame. A back 28 is formed by a square tube on the rear of the frame. Side 32 and side 33 are flat plates connected to front 30, center beam 26, and back 28.

The right angle gear box 18 is attached on cross bars 34 which extend beneath the front 30, back 28, and center beam 24. The cross bars, also square tubes, are attached to the front, back, and center beam. The gear box has horizontal power shaft 17, connected to the PTO 16. Vertical power shaft 19, with attached power pulley 52 having top groove 35 and bottom groove 36, extends from the gear box 18.

Front knife bearing (not shown) with vertical front knife shaft 39 is attached to the front of center beam 26. Back knife bearing 38 with knife shaft 40 is attached to the back of center beam 26 on the opposite side of gear box 18 from the front knife bearing (See FIG. 3). Projected to the center of the center beam 26, the axis of back knife shaft 40 is 20 inches from the axis of vertical shaft 19. Also projected to the center of the center beam 26, the axis of knife shaft 39 is 20 inches from the axis of the vertical shaft 19 on the opposite side from shaft 40. The distance from the axis of shaft 39 to the axis of shaft 40 is about 42 inches.

Each knife shaft 39 and 40 has a knife 42 about 40½ inch in length. Therefore it may be seen that as the knives are attached at their center to the bottom of the knife shafts that the tips will be over an inch from each other as they rotate. However, as the knives mow, each will cut a swath of 40½ inch wide on 40 inch centers. Stated otherwise, there will not be a gap between swaths. It is noted that each knife is shorter than the distance between adjacent knife shafts.

Each of the knives 42 are sharpened at each end to form the blades 20, which are the cutting edges.

Each of the knives 42 have a hole through the center for attachment to the bottom of the knife shafts. Each knife shaft is attached to a knife bearing, either knife bearing 39 or an additional knife bearing. The knife bearings alternate being on the forward side of the main beam 26 and on the rear of the main beam 26. The knife bearings spaced 40 inches on center measured along the center tube 26. Stated otherwise, the knife bearings on the front of the main beam are spaced at 80" on center and the bearing on the back of the main beam are also 80" on center. Therefore any vegetation along the entire strip of 20 feet (on the six row models) will be mowed by the blades without gaps. Each of the bearings will have a knife shaft journalled therein, either shaft 39 or 40 or additional knife shaft 46.

Each of the knife shafts will have a knife pulley 50 attached to the top. Each pulley will have two grooves thereby accommodating two V-belts. It may be seen in the drawings on one of the two V-belts grooves 35 and 36 on the power pulley 52 has front belt 54 which extends to the pulley 50, which is on the front shaft 39. Likewise a back belt 56 extends from the other groove in gear box pulley 52 to the pulley on the back shaft 40. Likewise an additional belt 58 on each of the pulleys 50 extends to each pulley on a shaft adjacent it.

Tension idlers 68 are attached to the frame 24 to be adjusted to keep the proper tension upon the belts 54 and 56.

Each of the idlers 68 is mounted upon arm 60 which is pivoted about a shaft 62 in the form of a threaded bolt. The idler 68 is pulled toward the belt 56 by spring 64. The spring is attached to an extension of idler shaft 66 upon which the idler 68 is mounted. The other end of the spring 64 is attached to the eye 70 of adjustment bolt 72. The adjustment bolt 72 extends through to clip 74. The clip 74 might be connected to either the center beam 26 or cross brace 31 which extends from the front 30 to the back 28. Increase of tension on the belt, whether caused by speed or power, causes the belt to stretch. The adjustable spring tension maintains the belt tension, thus keeping the belt tightness constant on the pulleys at all times.

The adjustable spring tension idler has the advantage of:

1. The belt tightener must be sensitive at all times. It must slip when the blade hits an unmovable object, but must hold to cut tough vegetation.

2. The spring stretches, not the belt. the stretch of the spring makes the longevity of the belt greatly increased preventing the stretching of the belt makes the longevity of the belt much greater.

The spring loaded idler eliminates the adjustments needed when a fixed idler is used. The adjustable spring tension idler has a wing nut 76 with a locking pin 78 making it easy to adjust the tightness of the belt and keeping it that way.

Instead of attaching the idler to a cross brace 31 it will be understood the idler could also be attached to the main center beam 26.

For normal topping operation the frame 24 is elevated to the desired elevation by the three point hitch 12. Often during use it will be desired to regularly change the height depending upon the height of the crop being topped at that time.

When the implement is being used as a mower or shredder it is desired to have the implement close to the ground; for example within three inches of the ground. It is also important that the knives not strike the earth, which puts undue strain upon the implement Therefore it is desired to have gage wheels mounted upon implement.

Tubes 80 are attached to the back 28 of the implement. As seen in FIG. 2 it will be noted that they are angled downward to the rear. Leg 82 in the form of square tubing is telescoped or spaced within the square tubing of the tube 80. The leg 82 is locked in position by a clamp (not shown). Wheel 84 with a pneumatic tire attached to the leg 82 engages the ground. The wheel 84 may be moved closer to the back 28 of the implement, 10, thus positioning the implement closer to the ground. Also extending the wheel 84 rearwardly will elevate the implement.

In certain operations it is desired to pull some object behind the implement. For this reason a plate 86 is attached to the back 28 at the center thereof. A hole through the plate forms the hitch by which the object may be attached to follow the implement.

Ends 90 include a plate with square tubing 91 extending from it. The tubing 91 may slip into the square tubing forming the front 30 and the back 28 of the implement. Also a larger square tubing 92 is placed in the center to slip into the main center beam 26. With these locked into position, a stand holder 94 is attached to the ends 90. Therefore a smaller square tubing stands 88 may be slipped within this so that it can be raised or lowered to keep the implement and particularly the knives above ground.

Thus on the sides 32 and 33 have stands 88 to support the implement with the knives above the ground. It will be understood if the knives 42 are resting upon the ground that they will tend to rust, thus dulling the blades 20. When the stands or supports are not being used for that purpose the stands 94 can be raised out of position.

Figure 5:
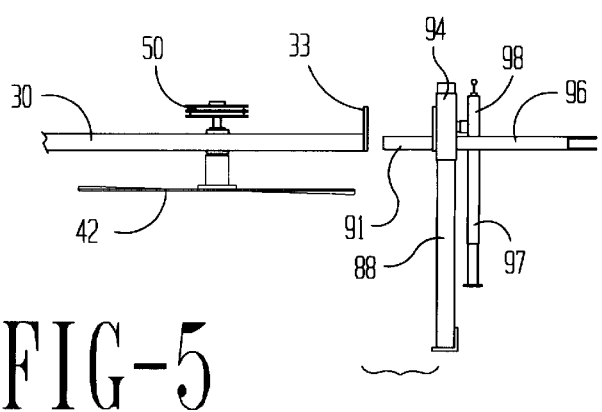
FIG. 5 is a front elevational view of the implement shown in FIG. 4.

Also a trailer hitch 96 maybe attached to the end 90 as an extension of the larger square tubing 92. A jack 97 is attached to the end 90 by a swivel joint 98. By the swivel joint the jack 97 may be swung into a vertical position as seen in FIG. 5 whereby the end of the implement may be raised and lowered making it easier to attach the hitch 96 onto a towing vehicle. Square tubing 99 attached to the front 30 and the back 28. The legs 82 are disengaged from the tubes 80 and inserted into the square tubing 99. With the axles of the wheels 84 parallel to the sides 32 and 33 the implement may be towed by the hitch 96.

Figure 6:
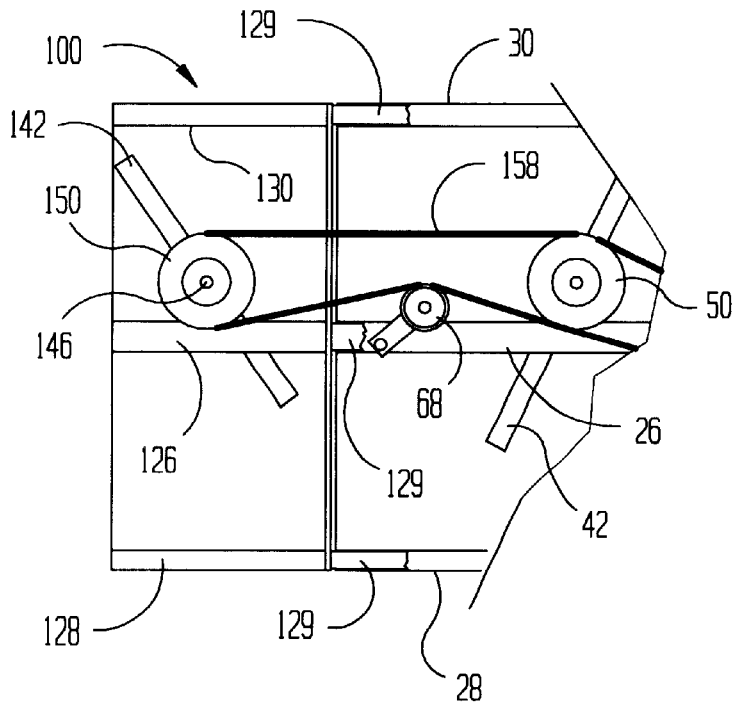
FIG. 6 is a plan view of one end of the implement with an added knife unit attached.
Figure 7:
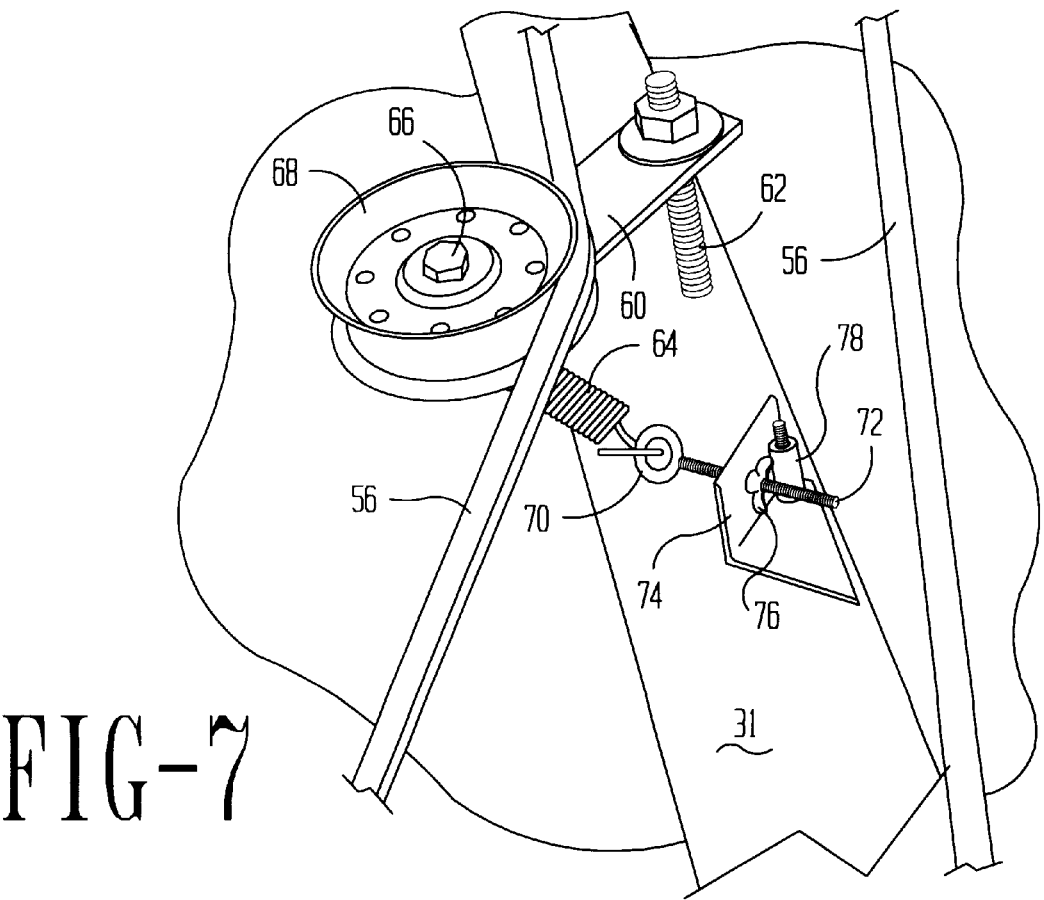
FIG. 7 is a perspective view of an idler pulley unit.

In the topping operation, the implement 10 may be changed from six row operation to eight row operation. An additional knife unit 100 is added to each side of the implement. FIG. 6 illustrates the added additional units 100.

Each unit 100 has an added front square tubing 130 as well as on added back square tubing 128 and the main center beam 126. Each of these elements would have a stub 129 attached to it to slide into the square tubing 26, 28, and 30. With this in place, an added bearing (not shown) with a added knife pulley 150 on added knife shaft 146 is added on the center beam 126. It is desired that an added knife 142 be shorter than knives 42. When the implement has the added knives it would be used only as a topping implement, therefore a shorter knife would be sufficient. The topping operation has no need to have the over lap of the knives as is required when using the implement for mowing or shredding.

Although the basic implement has been described as a six row topper it will be understood that a four row basic implement might be built and used. The basic unit having the knife pulleys, shafts, bearings, and knifes of the same length are called inside knife pulleys, shafts, bearings, and knives to distinguish them from the added knives.

The embodiment shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to point out the advantages and the progressive contribution to the agricultural arts and to enable one skilled in the art to make and use the invention. The limits of the invention and the bounds of the patent protection are measured by and defined in the following claims.

What is claimed is:

1. The structure of an agricultural topping and shredding device comprising:
   a) a horizontal frame having a front and back along a length of the frame and a side at each end of the frame,
   b) a plurality of knife pulleys, each attached to
   c) a vertical knife shaft journalled in
   d) a bearing attached to said frame along the length thereof,
   e) a knife attached to the lower portion of each vertical shaft,
   f) a right angle gear box attached to the middle of the frame between two of said knife pulleys,
   f') at least four knife pulleys and the associated knife shafts, bearings, and knives nearest the gear box forming the inside pulleys, shafts, bearings, and knives,
   g) a horizontal power shaft extending from the gear box,
   h) a vertical power shaft extending from the gear box,
   i) two power pulleys attached to the vertical power shaft, and
   j) two power belts, one belt trained over one of said power pulleys and over an adjacent knife pulley which is adjacent the gear box, and the other belt trained over the other power pulley and over the other adjacent knife pulley which is adjacent the gear box.

2. The structure as defined in claim 1 further comprising:
   k) an agricultural tractor having a three point hitch and a power take off shaft,
   l) the three point hitch attached to the horizontal frame, and
   m) the power take off shaft connected to the horizontal power shaft.

3. The structure as defined in claim 1 wherein:
k) the distance from each inside vertical knife shaft to the nearest inside vertical knife shaft is the same for all inside vertical knife shafts.

4. The structure as defined in claim 1 wherein:
k) the diameter of each inside knife pulley is the same.

5. The structure as defined in claim 1 further comprising:
k) an end knife pulley adjacent each side of the frame,
l) each end knife pulley attached to an end vertical knife shaft,
m) each vertical knife shaft, except the end vertical knife shafts, attached to two knife pulleys, and
n) a belt from each knife pulley to an adjacent pulley.

6. The structure as defined in claim 1 wherein:
k) each of said knives are attached at their center to the vertical shaft.

7. The structure as defined in claim 6 wherein the length of each inside knife is less than the distance between the axis of the shaft to which it is attached and the axis of an adjacent knife shaft.

8. The structure as defined in claim 1 further comprising:
k) a main center beam extending lengthwise along the frame,
l) said bearings mounted on the main center beam, on the opposite side of the main center beam from the closest bearing on each side.

9. The structure as defined in claim 8 wherein:
m) each knife is attached at its center to the vertical shaft.

10. The structure as defined in claim 9 wherein:
n) each inside knife having the same length and
o) the length of each inside knife being greater than half the distance between the axis of the shaft to which it is attached and the axis of the nearest inside shaft on the same side of the main center beam.

11. The structure as defined in claim 10 wherein the length of each knife is less than the distance between the axis of the shaft to which it is attached the axis of and an adjacent knife shaft.

12. The structure as defined in claim 1 further comprising:
k) leg tubes attached to the frame,
l) two legs,
m) each leg inserted in a leg tube, and
n) a wheel journalled upon each leg.

13. The structure as defined in claim 12 further comprising:
o) two of the leg tubes are gage tubes attached to the back of the frame,
p) a front of each leg is higher than the rear of each leg, and
q) the wheels function as gage wheels when the device is in operation.

14. The structure as defined in claim 12 further comprising:
o) one of the tubes is a trail tube attached to the back of the frame,
p) and one of the tubes is a trail tube attached to the front of the frame, with
q) each of the wheel axles parallel to the sides of the frame with the legs inserted in the trail tubes so that the wheels function as trailer wheels when the device is being towed.

15. The structure defined in claim 14 further comprising:
r) two of the tubes are gage tubes attached to the back of the frame,
s) the gage tubes are attached to the frame so that a leg attached the gage holder have a front higher than a rear, and
t) each wheel axle is parallel to the back of the frame.

16. The structure as defined in claim 1 further comprising:
k) each belt having a taut run and a slack run, and
l) an idler pulley forced against the slack run.

17. The structure defined in claim 5 further comprising:
o) each belt having a taut run and a slack run, and
p) an idler pulley forced against the slack run.

18. The structure of an agricultural topping and shredding device comprising:
a) a horizontal frame having a front and back along a length of the frame and a side at each end of the frame,
b) a plurality of knife pulleys, each attached to
c) a vertical knife shaft journalled in
d) a bearing attached to said frame along the length thereof,
e) a knife attached to the lower portion of each vertical shaft,
f) a right angle gear box attached to the frame in the middle of the frame between two of said knife pulleys,
f') at least four knife pulleys and the associated knife shafts, bearings, and knives nearest the gear box being the inside pulleys, shafts, bearings, and knives,
g) a horizontal power shaft extending from the gear box,
h) a vertical power shaft extending from the gear box,
i) two power pulleys attached to the vertical power shaft,
j) two power belts, one belt trained over one of said power pulleys and over an adjacent knife pulley which is adjacent the gear box, and the other belt trained over the other power pulley and over the other adjacent knife pulley which is adjacent the gear box,
k) an agricultural tractor having a three point hitch and a power take off shaft,
l) the three point hitch attached to the horizontal frame, and
m) the power take off shaft connected to the horizontal power shaft,
n) shank holders attached to the frame,
o) two shanks,
p) each shank attached to a shank holder, and
q) a wheel journalled upon a shank axle on each shank,
r) two of the shank holders are gage holders attached to the back of the frame, with
s) the shank axles parallel to the back of the frame so that the wheels function as gage wheels when the device is in operation.

19. The method of towing an agricultural implement having front, back, and two side identified as front side and back side with the distance from side to side at least twice the distance from front to back, and an attachment for connecting the implement to a tractor located on the front equal distance between the sides, comprising the steps of:
a) attaching a tow tube on the front at a short distance from the back side,
b) attaching a tow tube on the back at said short distance from the back side,
c) attaching a towing hitch to the front side of the implement,
d) placing a leg of a wheel assembly including wheel with an axle in one of the tow tubes and placing a leg of a another wheel assembly including a wheel with an axle in the other of the tow tubes with the axles of the wheels co-axial, and e) towing the implement to a desired location by pulling the towing hitch.

20. The method of operating an implement at the location to which it has been towed by the method as defined in claim 19 comprising:

f) attaching two gage tubes to the back of said implement, g) removing the legs from the tow tubes h) placing the legs in the gage tubes, with the axles of the wheels co-axial, and i) operating the implement by a tractor connected to said attachment.

* * * * *